(12) United States Patent
Foss et al.

(10) Patent No.: US 9,395,221 B2
(45) Date of Patent: Jul. 19, 2016

(54) MAGNETIC FLOWMETER WITH SATURATION DETECTION OF THE MEASUREMENT CIRCUITRY

(71) Applicant: Rosemount Inc., Chanhassen, MN (US)

(72) Inventors: Scot Ronald Foss, Eden Prairie, MN (US); Bruce David Rovner, Minneapolis, MN (US); Jared James Dreier, Chaska, MN (US)

(73) Assignee: Rosemount Inc., Chanhassen, MN (US)

( * ) Notice: Subject to any disclaimer, the term of this patent is extended or adjusted under 35 U.S.C. 154(b) by 195 days.

(21) Appl. No.: 14/037,915

(22) Filed: Sep. 26, 2013

(65) Prior Publication Data
US 2015/0082905 A1 Mar. 26, 2015

(51) Int. Cl.
*G01F 1/60* (2006.01)
*G01F 1/58* (2006.01)

(52) U.S. Cl.
CPC . *G01F 1/588* (2013.01); *G01F 1/60* (2013.01)

(58) Field of Classification Search
None
See application file for complete search history.

(56) References Cited

U.S. PATENT DOCUMENTS

| 4,563,904 A | 1/1986 | Geisler et al. |
| 4,916,381 A | 4/1990 | Gelecinskyj et al. |
| 5,325,728 A | 7/1994 | Zimmerman et al. |
| 5,351,554 A | 10/1994 | Budmiger |
| 5,372,045 A | 12/1994 | Schulz et al. |
| 5,530,639 A | 6/1996 | Schulz et al. |
| 5,639,970 A | 6/1997 | Schulz |
| 6,453,754 B1 | 9/2002 | Florin |
| 6,611,775 B1 | 8/2003 | Coursolle et al. |
| 6,644,127 B1 | 11/2003 | Matzen |
| 6,920,799 B1 | 7/2005 | Schulz |
| 7,619,418 B2 | 11/2009 | Schulz et al. |
| 7,921,733 B2 | 4/2011 | Foss et al. |

(Continued)

FOREIGN PATENT DOCUMENTS

| EP | 2 381 224 A2 | 10/2011 |
| GB | 2081449 A | 2/1982 |

(Continued)

OTHER PUBLICATIONS

Office Action from U.S. Appl. No. 14/038,065, dated Mar. 17, 2015.

(Continued)

*Primary Examiner* — Harshad R Patel
(74) *Attorney, Agent, or Firm* — Westman, Champlin & Koehler, P.A.

(57) ABSTRACT

A magnetic flowmeter for measuring flow of a process fluid in a pipe includes a magnetic coil disposed adjacent to the pipe configured to apply a magnetic field to the process fluid. First and second electrodes are disposed within the pipe and electrically coupled to the process fluid and configured to sense an electromotive force (EMF) induced in the process fluid due to the applied magnetic field and flow of the process fluid. Input circuitry is coupled to the first and second electrodes and provides an output related to the sensed EMF. Diagnostic circuitry coupled to the input circuitry is configured to identify a saturation related condition and responsively provide a diagnostic output. In another embodiment, saturation prevention circuitry prevents saturation of the input circuitry.

17 Claims, 6 Drawing Sheets

(56) References Cited

U.S. PATENT DOCUMENTS

| | | |
|---|---|---|
| 7,921,734 B2 | 4/2011 | Foss et al. |
| 8,590,361 B1 | 11/2013 | Feller |
| 2006/0081067 A1 | 4/2006 | Budmiger |
| 7,921,734 B2 | 4/2011 | Foss et al. |
| 8,590,361 B1 | 11/2013 | Feller |
| 2006/0081067 A1 | 4/2006 | Budmiger |
| 2006/0095217 A1 | 5/2006 | Coursolle et al. |
| 2008/0250866 A1 | 10/2008 | Tschabold |
| 2008/0258736 A1* | 10/2008 | Schulz et al. ............. 324/537 |
| 2010/0288054 A1* | 11/2010 | Foss et al. ............. 73/861.12 |

FOREIGN PATENT DOCUMENTS

| | | |
|---|---|---|
| GB | 2 152 220 A | 7/1985 |
| WO | WO 0190704 A2 | 11/2001 |
| WO | 2008/042290 A2 | 4/2008 |
| WO | WO 2011/128656 | 10/2011 |

OTHER PUBLICATIONS

Notification of Transmittal of the International Search Report and the Written Opinion of the International Searching Authority, or the Declaration for PCT Application No. PCT/US2010/025728, filed Mar. 1, 2010, 11 pages.

Notification of Transmittal of the International Search Report and the Written Opinion of the International Searching Authority, or the Declaration for PCT Application No. PCT/US2014/050673, dated Oct. 31, 2014.

Office Action from U.S. Appl. No. 14/038,065, dated Nov. 3, 2014.

Notification of Transmittal of the International Search Report and the Written Opinion of the International Searching Authority, or the Declaration for PCT Application No. PCT/US2014/052654, dated Dec. 3, 2014.

* cited by examiner

MAGNETIC FLOWMETER WITH SATURATION DETECTION OF THE MEASUREMENT CIRCUITRY

BACKGROUND

The present invention relates to magnetic flowmeters of the type used to measure flow of process fluid through process piping. More specifically, the present invention relates to saturation of electronics used to measure such flow.

Field devices are used in industrial process monitoring and/or control systems to monitor process variables associated with a particular process. Such process variables can include fluid pressure, fluid flow rate, fluid temperature, level, etc.

Magnetic flow meters are a type of field device that are used to measure a fluid flow rate of a conductive process fluid as it flows within a flow tube that is coupled to a pipe. A particular magnetic flow meter includes an electromagnet coil and electrodes. In accordance with Faraday's law of electromagnetic induction, the electromagnet coil is used apply a magnetic field to the process fluid within the flow tube. The applied magnetic field and movement of the fluid induces an electromotive force (EMF) in the process fluid, which is proportional to the flow rate. The electrodes are positioned in the flow tube to make electrical contact with the flowing process fluid to sense the induced EMF. In a particular embodiment, the EMF is measured by the flow meter using an amplifier connected to the electrodes to amplify the EMF signal, and an analog-to-digital converter (ADC) to quantize the output of the amplifier to produce a data value related to the fluid flow rate.

During operation of the magnetic flowmeter, there are a number of conditions which can cause the flowmeter to incorrectly provide an output indicating that there is no flow. One such condition is caused by saturation of the circuitry coupled to the electrodes. Saturation occurs when a signal is applied to an input of an electrical component which exceeds a maximum level for the component. In a magnetic flowmeter, when saturation occurs in the circuitry coupled to the electrodes, a condition may arise in which measurement circuitry incorrectly interprets the measured signal to have a value indicating that there is no flow. This is a type of "on scale" error. The saturation of the circuitry is difficult to detect and can lead to incorrect flow measurements. Issues related to such saturation are discussed in U.S. Pat. No. 7,921,734 to Foss et al, issued Apr. 12, 2011, entitled SYSTEM TO DETECT POOR PROCESS GROUND CONNECTIONS and commonly assigned herewith.

SUMMARY

A magnetic flowmeter for measuring flow of a process fluid in a pipe includes a magnetic coil disposed adjacent to the pipe configured to apply a magnetic field to the process fluid. First and second electrodes are disposed within the pipe and electrically coupled to the process fluid and configured to sense an electromotive force (EMF) induced in the process fluid due to the applied magnetic field and flow of the process fluid. Input circuitry is coupled to the first and second electrodes and provides an output related to the sensed EMF. Diagnostic circuitry coupled to the input circuitry is configured to identify a saturation related condition and responsively provide a diagnostic output. In another embodiment, saturation prevention circuitry prevents saturation of the input circuitry.

DETAILED DESCRIPTION OF ILLUSTRATIVE EMBODIMENTS

In various aspects, an industrial process variable transmitter is provided which includes circuitry configured to sense an electromotive force (EMF) that is related to flow of fluid flowing through process piping. Techniques are provided to detect or prevent saturation or conditions which could lead to saturation of circuitry in the transmitter. Optional techniques are provided to correct, compensate and/or prevent for such saturation. The following discussion is directed to flowmeters of the type which measure flow using an applied magnetic field. However, the invention is not limited to such a process variable transmitter.

Figure 1:
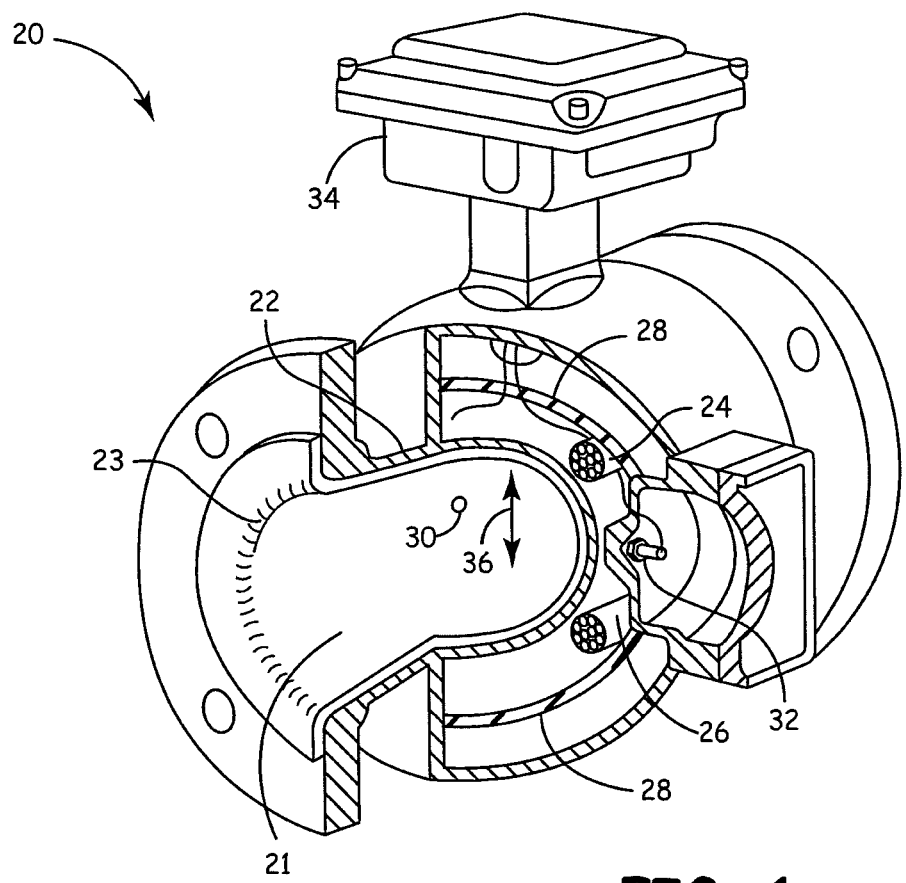
FIG. 1 is a partial cut away view of a magnetic flowmeter.

FIG. 1 is a partially cut away view of a magnetic flowmeter 20 in which embodiments of the present invention are particularly useful. Magnetic flowmeter 20 includes a flowtube 22 formed of low magnetic permeability material with an electrically insulating liner 23, an electromagnet (coil) 26, a ferromagnetic core or shield 28 and electrodes 30, 32. The electromagnet coil 26 and the electrodes 30, 32 are wired to transmitter circuit 34. In operation, the transmitter circuit drives the electromagnet 26 with an electrical current, and the electromagnet 26 produces a magnetic field 36 indicated by arrows inside the flowtube 22. Process fluid 21 flows through the magnetic field in the flowtube 22, and the flow induces an electromotive force (EMF, voltage) in the liquid 21. The insulating liner 23 prevents leakage of the EMF from the liquid 21 to the metal flowtube 22. The electrodes 30, 32 contact the fluid 21 and pick up or sense the EMF which, according to Faraday's law, is proportional to the flow rate of the liquid 21 in the flowtube 22.

Figure 2:
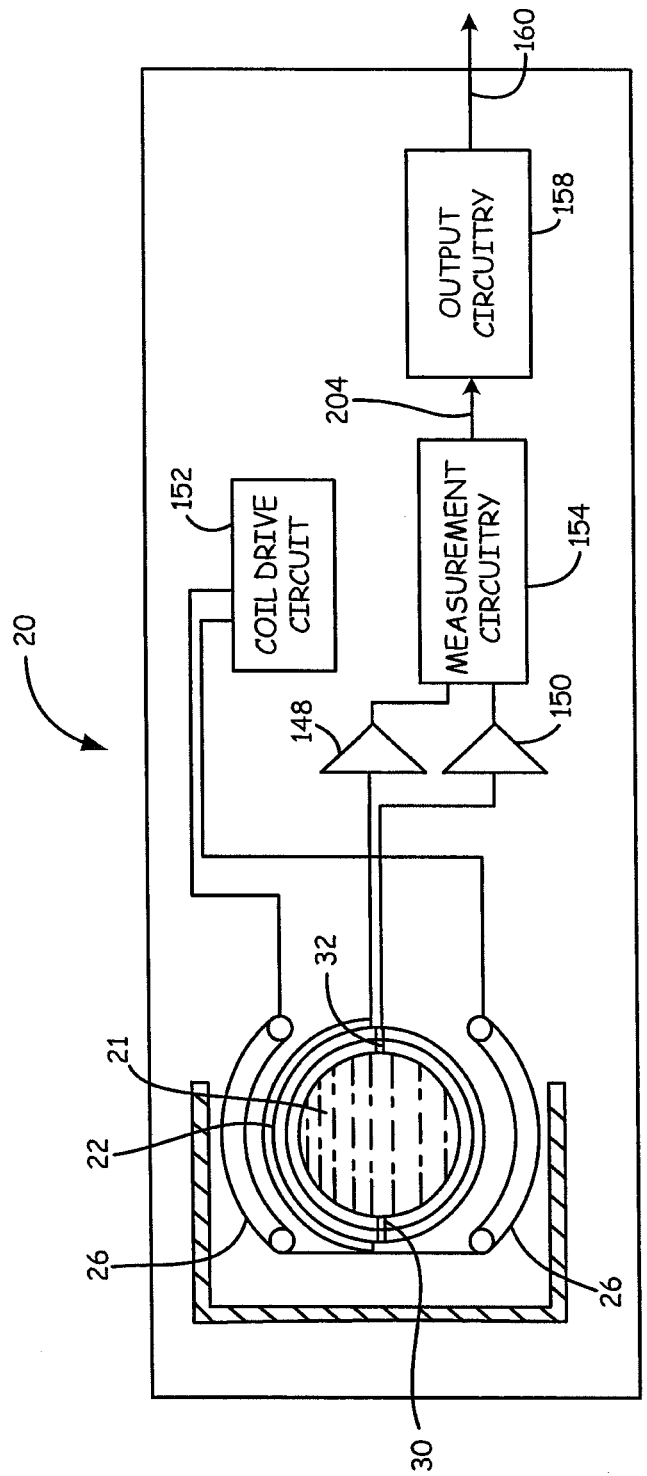
FIG. 2 is a simplified electrical schematic diagram of the magnetic flowmeter of FIG. 1.

FIG. 2 is a diagrammatic view of circuitry of magnetic flowmeter transmitter 20. The magnetic flowmeter 20 includes a flowtube 22 adapted to carry a flowing fluid 21 that is electrically coupled to the flowtube 22. Electromagnetic coils 26 are positioned proximate flowtube 22 to apply a magnetic field to the process fluid in response to a drive signal from coil drive circuitry 152. Electrodes 30 and 32 sense the EMF induced in fluid 21. The EMF is related to the flow of fluid 21 and the applied magnetic field 36. Electrodes 30 and 32 couple to measurement and diagnostic circuitry 154 through amplifiers 148 and 150. Measurement and diagnostic circuitry 154 provides a measurement output related to flow in accordance with known techniques. Measurement and diagnostic circuitry 154 can include, for example, suitably programmed or configured microprocessor(s) or digital signal processor (DSP) circuitry. Amplifiers 148 and 150 along with measurement and diagnostic circuitry 154 generally provide a "front end" or input circuitry for the magnetic flowmeter 20.

The output 204 of measurement and diagnostic circuitry 154 is provided to output circuitry 158 for transmission to control or monitoring circuitry remote from magnetic flowmeter 20. However, the output 204 can be transmitted to other locations as desired or used internally by flowmeter 20. Output circuitry 158 may provide a pulse output, a 4-20 mA current output, a digital output, a wireless output, or other type of output as desired. In this example, the output of output circuitry 158 is shown coupled to a process control loop 160.

During operation, amplifiers 148 and 150 detect the relatively small EMF signal generated in the flowing fluid 21 in response to the magnetic field applied by coils 26. In order for the relatively small EMF signal to be used by measurement and diagnostic circuitry 154, it must be substantially amplified by the amplifiers 148, 150. In some instances, the amplified signal applied to the measurement and diagnostic circuitry 154 can exceed the maximum input value of the measurement and diagnostic circuitry 154 and become saturated. When this occurs, the measurement and diagnostic circuitry 154 is not able to sense small AC changes in the sensed EMF and may incorrectly calculate the flow rate. For example, the measurement circuitry may incorrectly determine that the flow rate is zero. Since there are instances in which the flow rate may in fact be zero, such a measurement can be easily misinterpreted by an operator, control system or other monitoring circuitry. This is called an "on-scale" error.

There are a number of occurrences which can lead to such saturation. For example, particles or debris carried in the process fluid may contact or impact electrodes 30 or 32 causing measurement and diagnostic circuitry 154 to become saturated. This is referred to as "AC saturation." Similarly, an electrical charge can be built up with time between electrodes 30 and 32 which eventually causes saturation of measurement and diagnostic circuitry 154. Such an electrical charge may be due to any number of sources including currents applied to the process fluid 21, chemical reactions in the process fluid 21, improper grounding, a cathodic current through the flowmeter used for corrosion prevention, formation of deposits on the electrodes 30 and 32 or other causes. This is referred to as "DC saturation."

Figure 3A:
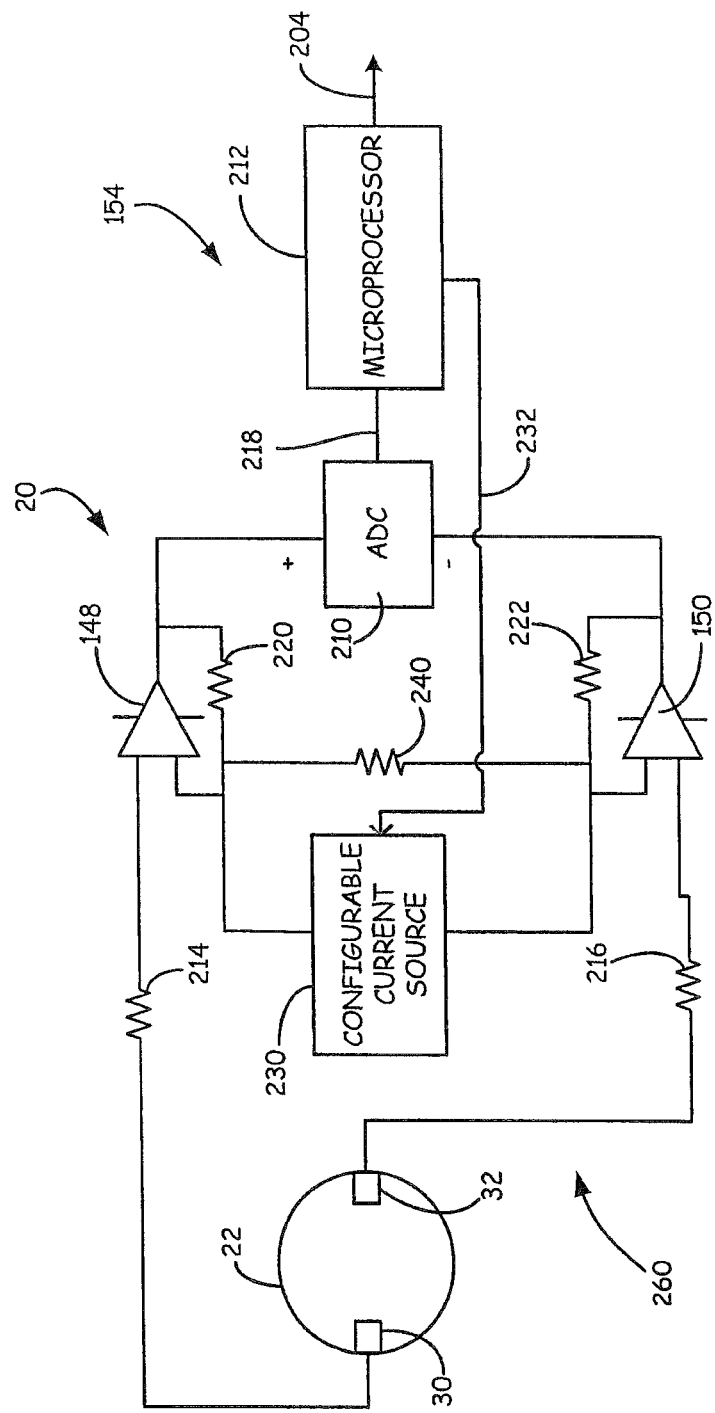
FIGS. 3A and 3B are simplified schematic diagram showing saturation detection and correction circuitry for a DC coupled front end input circuitry of a magnetic flowmeter.
Figure 4:
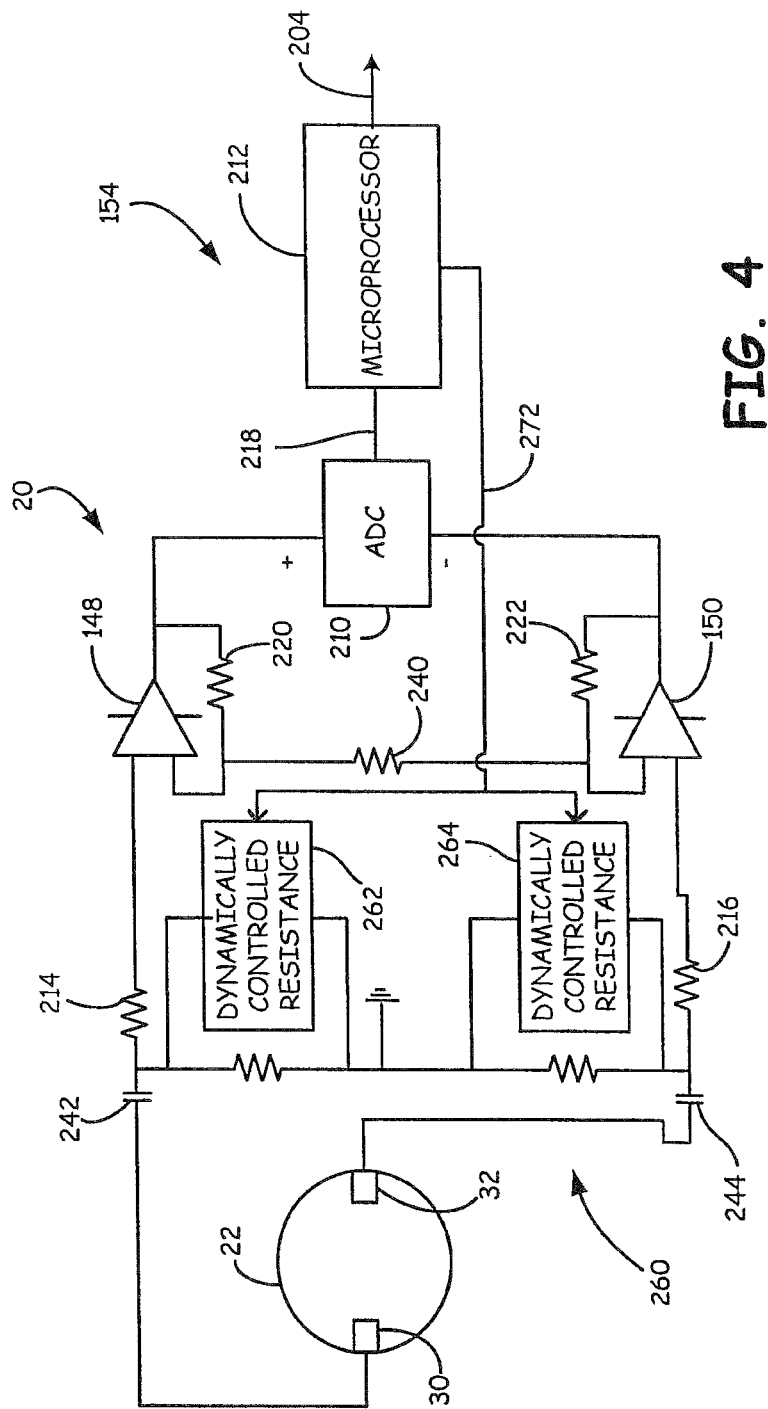
FIG. 4 is a simplified schematic diagram showing saturation detection and correction circuitry for a AC coupled front end input circuitry of a magnetic flowmeter.

FIGS. 3A,B and 4 illustrate two examples of saturation detection and correction circuitry. The circuitry of FIGS. 3A,B is directed to DC coupled circuitry while the circuitry of FIG. 4 is directed to AC coupled circuitry.

FIG. 3A is a simplified schematic diagram of magnetic flowmeter 20 including saturation detection and correction circuitry in accordance with one example embodiment. In FIG. 3A, measurement and diagnostic circuitry 154 is illustrated as an analog to digital converter 210 and a microprocessor 212. Amplifiers 148 and 150 couple to electrodes 30 and 32 through resistors 214 and 216, respectively. Resistor 240 is coupled between the inverting inputs of amplifiers 148 and 150. Amplifiers 148, 150 are configured to receive negative feedback through resistors 220 and 222, respectively. FIG. 3A also illustrates a configurable current source 230 which receives a current source control signal 232 from microprocessor 212.

An AC or pulsed DC voltage appears across electrodes 30, 32 due to the periodic reversal of the magnetic field applied by coil 26. However, a DC offset voltage can also appear between electrodes 30, 32 as discussed above. With time, this DC voltage can drive the voltage applied to the analog to digital converter (ADC) 210 to a level which is beyond the maximum threshold of converter 210. When this occurs, microprocessor 212 may incorrectly interpret data 218 as indicating that there is no flow through pipe 20.

FIG. 3A is an example of DC coupling of amplifiers 148, 150 to electrodes 30, 32, respectively. In some instances, DC coupled amplifiers are preferable, such as, when working with process fluids which comprise slurries. As discussed above, in some instances a DC offset voltage can arise between electrodes 30 and 32. This DC offset voltage may slowly increase with time and eventually reach a level such that the small AC flow signal due to the applied magnetic field is not capable of being sensed by the analog to digital converter 210. This is known as "saturation." Typically, the analog to digital converter 210 reaches saturation before other electrical components in the circuit. Therefore, the output from analog to digital converter 210 can be used to reliably indicate saturated front end electronics. As illustrated in FIG. 3A, the analog to digital converter 210 provides an output 218 to microprocessor 212. Microprocessor typically monitors AC flow signals in this output in order to calculate flow rate. However, in one example, the microprocessor also monitors the DC offset value in the digitized output 218. When this DC offset value reaches a maximum level of the ADC 210, the microprocessor can provide a determination that saturation has occurred. Additionally, a warning status can be set before the differential voltage saturates to provide a predictive failure warning for increased product robustness and less system down time.

Further, upon detection of front end saturation or the presents of a DC offset voltage, saturation correction circuitry 260 can be used to remove or reduce the DC offset voltage between electrodes 30 and 32. In the configuration of FIG. 3A, saturation correction circuitry 260 includes a configurable current source (DC signal source) coupled to amplifiers 148 and 150. Configurable current source 230 can be used to remove the DC offset voltage appearing between amplifiers 148 and 150 from electrodes 30,32, respectively. Based upon the magnitude of the saturation or DC offset voltage seen at analog to digital converter 210, microprocessor 212 can apply a configurable current source control signal 232 to configurable current source 230 whereby a voltage is applied to the inverting inputs of amplifiers 148, 150 which has the same magnitude as the DC offset causing the saturation voltage but of opposite polarity. The configurable current source 230 can be any type of configurable source including a voltage source. Configurable source 230 is used to apply a relative DC offset value between the two amplifiers 148 and 150. For example, if a large DC offset voltage is detected, a larger current can be applied. This is used to cancel the DC offset voltage between electrodes 30 and 32 and thereby prevent saturation from occurring in the ADC 210 and allow the flowmeter to continue to correctly measure flow rate. Alternatively a configurable voltage source could be place in series with resistor 240.

Figure 3B:
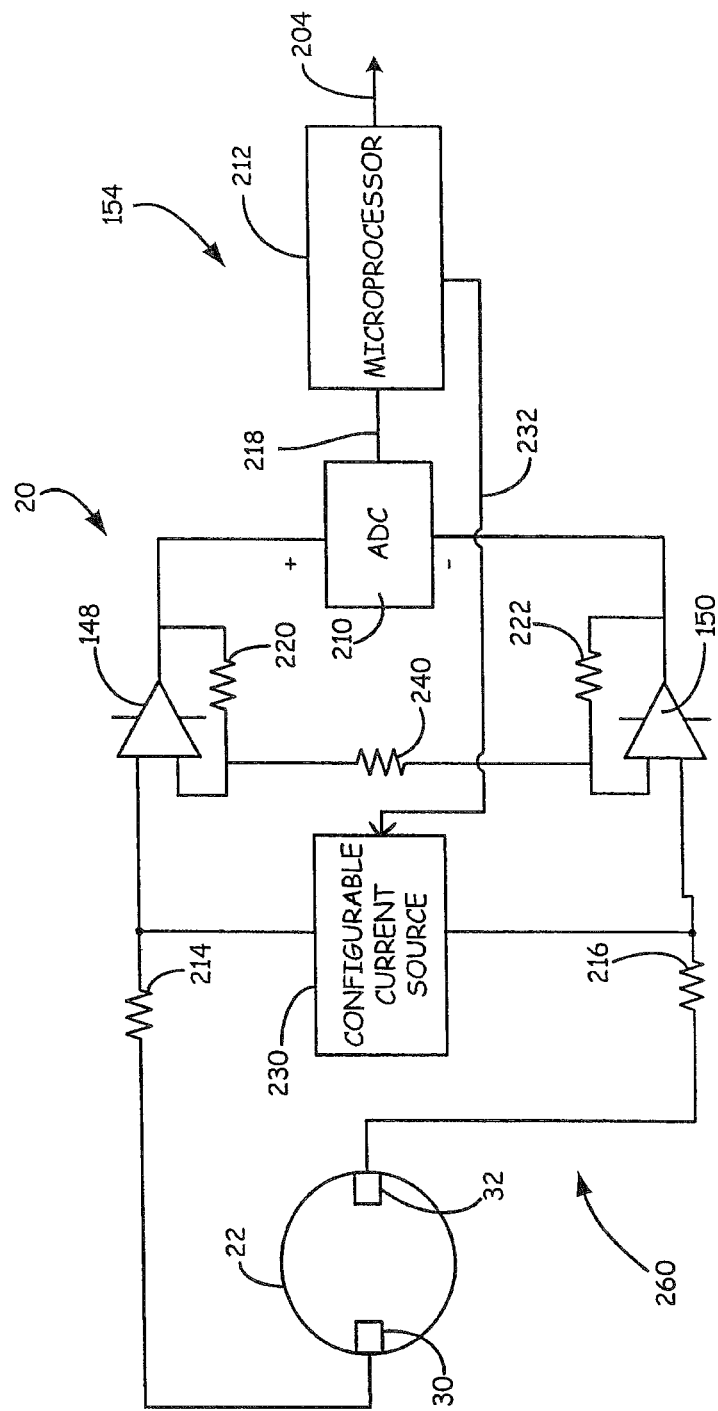

FIG. 3B shows another example of saturation correction circuitry. Configurable current source 230 can be used to remove the DC differential voltage appearing between the electrodes 30,32, respectively. Based upon the magnitude of the DC offset voltage seen at analog to digital converter 210, microprocessor 212 can apply a configurable current source control signal 232 to configurable current source 230 whereby a voltage is applied to electrodes 30 and 32 which has the same magnitude as the saturation voltage but of opposite polarity. Source 230 is used to apply a relative offset value between the two electrodes 30 and 32. This can be used to remove the DC offset voltage between electrodes 30 and 32 and thereby prevent saturation from occurring and allow the flowmeter to continue to correctly measure flow rate. The correction is applied typically at a very low frequency and therefore does not interfere with the pulsed DC flow measurement.

As discussed above, it is also possible for an AC differential voltage to drive the front end circuitry into saturation. FIG. 4 illustrates a configuration in which the flowmeter electronics is AC coupled to electrodes 30, 32 through capacitors 242, 244, respectively. This configuration operates in a similar manner with amplifiers 148, 150 providing an amplified signal to analog to digital converter 210. Analog to digital converter 210 provides electrode voltage data 218 which is representative of the AC differential voltage across electrodes 30, 32 to microprocessor 212. In the configuration of FIG. 4, capacitors 242 and 244 block the DC differential voltage between electrodes 30 and 32 from reaching amplifiers 148 and 150. This prevents the DC saturation condition described above from affecting flow measurements. However, it is still possible for an AC saturation condition to occur.

Figure 5:
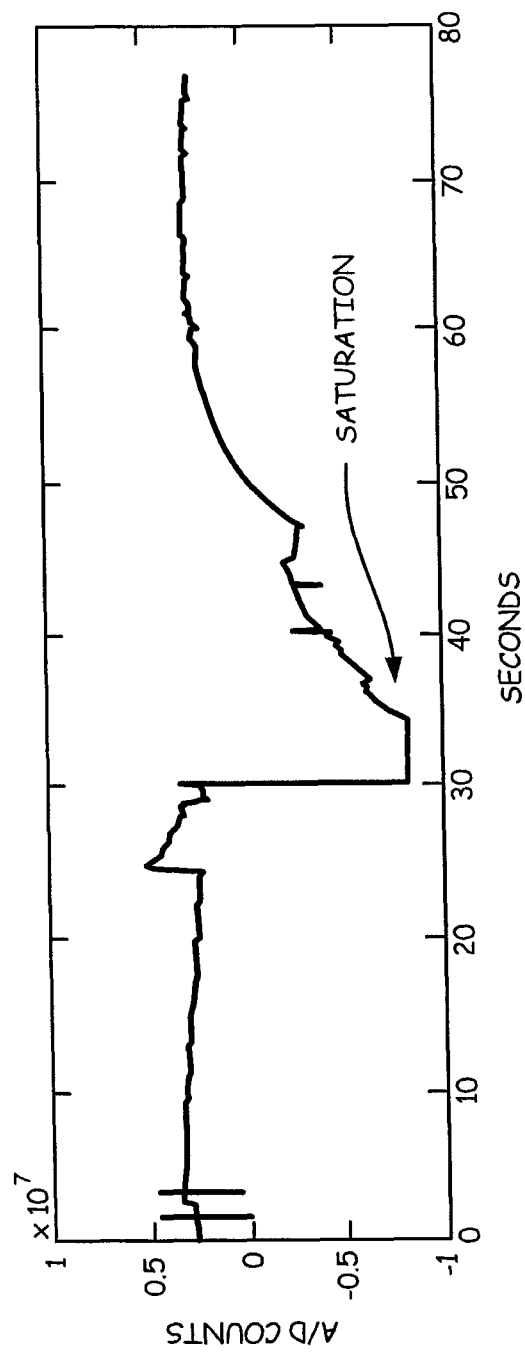
FIG. 5 is a graph of an output from an analog to digital converter of the circuitry of FIG. 4 versus time.

FIG. 5 is a graph of analog to digital counts versus time for the AC coupled flowmeter electronics of FIG. 4. As illustrated in FIG. 5, at a time of 30 seconds, an AC spike occurs between electrodes 30 and 32 driving the analog to digital converter 210 into saturation. This can occur, for example, when debris in a slurry impacts one of the electrodes 30, 32. As illustrated in FIG. 5, after a time period the AC coupling will recover from saturation as the charge on capacitors 242 or 244 slowly discharges. However, this recovery may take a number of seconds due to the large RC time constant required to measure the pulsed DC flow signal during which the flow measurement will indicate zero flow. In the configuration of FIG. 4, the output from the analog to digital converter 210 can also be used by microprocessor 212 to identify a saturation condition. More specifically, microprocessor 212 can identify when the value of the data output 218 from analog to digital converter 210 reaches a maximum or minimum level and enters saturation as illustrated by the plateau in the graph of FIG. 5. Upon detection of such a saturation event, the microprocessor 212 can provide an output indicating that saturation has occurred. Similarly to the configuration provided with respect to DC saturation of FIG. 3B, this information can be provided to other circuitry or an operator to indicate the occurrence of the saturation event.

FIG. 4 also illustrates saturation correction circuitry 260 configured to reduce the charge on the input capacitors 242, 244 which causes the saturation. Circuitry 260 includes dynamically controlled resistances 262 and 264 coupled to capacitors 242, 244, respectively. Dynamically controlled resistances 262, 264 are controlled using dynamic resistance control signal 272 from microprocessor 212. The dynamically controlled resistances 262, 264 selectively shunt charge from capacitors 242, 244, respectively, to electrical ground. The amount of shunting and/or the duration of the shunting can be controlled by microprocessor 212 in accordance with the count output from the analog to digital converter 210. For example, microprocessor 212 can monitor the output from analog to digital converter 210 until the output is brought below the saturation level. The discharge can continue until the charge build up is completely discharged from a capacitor 242, 244. This can be configured to happen significantly faster than the slow discharge illustrated in the graph of FIG. 5.

The detection, correction and/or prevention of saturation can be particularly advantageous because zero flow conditions can arise due to a number of occurrences. For example, the flow itself may in fact be zero, an empty pipe, or a saturation condition could arise. The techniques discussed herein help identify the source of the zero flow condition. Further, the circuitry to correct the saturation reduces the down time required to diagnose a zero flow condition. In one configuration, the circuitry provides an estimated flow rate measurement as a function of a saturation determination. For example, upon detection of saturation, the flow rate output can be set to a level of flow just prior to or trending from, the saturation occurrence. This estimation can be continued based upon trending and revert to an actual measurement once the saturation condition has been removed or compensated. In another example configuration, the circuitry shown in FIG. 3B is periodically used to remove the DC offset regardless of detection of a saturation condition. In such a configuration, the occurrence of any DC offset at the electrodes is periodically reduced or eliminated without the requirement that saturation be detected.

Although the present invention has been described with reference to preferred embodiments, workers skilled in the art will recognize that changes may be made in form and detail without departing from the spirit and scope of the invention. As used herein, input circuitry includes the amplifier circuitry and the analog to digital converter circuitry discussed above. Diagnostic circuitry is used to identify saturation of the input circuitry. The circuitry can be implemented in any appropriate manner. In one implementation, the diagnostic circuitry is implemented in a microprocessor and may optionally include an analog to digital converter. Although the specific discussion herein references saturation or offset voltage detection with the use of a microprocessor, any appropriate circuitry may be used. For example, saturation or offset voltage detection can be implemented in hardware, such as through the use of comparison circuitry or the like. As used herein, the term diagnostics circuitry includes saturation detection, correction, and/or prevention circuitry. As used herein, the term saturation related condition includes saturation of input circuitry as well as an impeding saturation. For example, an AC or DC offset voltage between the electrodes or the input circuitry is a saturation related condition. The saturation correction circuitry can act as saturation condition relief circuitry to relieve a saturation condition including a saturation related condition.

What is claimed is:

1. A magnetic flowmeter for measuring flow of a process fluid in a pipe, the flowmeter comprising:
   a magnetic coil disposed adjacent to the pipe configured to apply a magnetic field to the process fluid;
   first and second electrodes disposed within the pipe which are electrically coupled to the process fluid and configured to sense an electromotive force (EMF) induced in the process fluid due to the applied magnetic field and flow of the process fluid; and
   diagnostic circuitry including input circuitry coupled to the first and second electrodes which provides an output related to the sensed EMF, the diagnostic circuitry configured to identify a saturation related condition and responsively provide a diagnostic output, wherein the saturation related condition is caused by at least one of:
   a DC offset voltage between the first and second electrodes, and
   an AC offset voltage generated by at least one of the first and second electrodes.

2. The apparatus of claim 1 including circuitry configured to relieve the saturation related condition in response to the diagnostic output.

3. The apparatus of claim 1 wherein the input circuitry comprises amplifier circuitry electrically coupled to the first and second electrodes configured to provide an amplified output, and analog to digital conversion circuitry configured to provide a digitized output representative of the amplified output.

4. The apparatus of claim 1 including a DC signal source selectively coupled to the input circuitry as a function of the saturation related condition.

5. The apparatus of claim 4 wherein the DC signal source comprises a configurable current source.

6. The apparatus of claim 4 wherein the DC signal is coupled to an amplified output.

7. The apparatus of claim 4 wherein the DC signal is coupled to an input of an amplifier.

8. The apparatus of claim 1 including discharge circuitry which discharges a capacitor which couples the input circuitry to the first electrode.

9. The apparatus of claim 8 wherein the discharge circuitry comprises a dynamically controlled resistance to electrically discharge the capacitor.

10. The apparatus of claim 1 wherein the diagnostic circuitry provides an estimated flow rate measurement as a function of the saturation related condition.

11. The apparatus of claim 1 wherein the diagnostic circuitry provides an alert indicating galvanic corrosion based upon the saturation related condition.

12. A method for measuring flow of a process fluid in a pipe, comprising:
   applying a magnetic field to process fluid flowing through the pipe with a magnetic coil;
   sensing an electromotive force (EMF) induced in the pipe due to the applied magnetic field and flow of the process fluid using first and second electrodes;
   measuring the EMF with input circuitry, the measured EMF indicative of flow of the process fluid; and
   monitoring the input circuitry, identifying a saturation related condition and responsively providing a diagnostic output, wherein the saturation related condition is caused by at least one of:
      a DC offset voltage between the first and second electrodes, and
      an AC offset voltage generated by at least one of the first and second electrodes.

13. The method of claim 12 including coupling a DC signal source to input circuitry as a function of the saturation related condition.

14. The method of claim 13 wherein the DC signal source is coupled to an output of amplifier circuitry.

15. The method of claim 12 including discharging a capacitor which couples input circuitry to the first electrode.

16. The method of claim 12 including providing an estimated flow rate measurement in response to a saturation condition.

17. The method of claim 12 including providing an alert indicating galvanic corrosion based upon the saturation related condition.

* * * * *